United States Patent Office 3,733,326
Patented May 15, 1973

3,733,326
INHIBITION OF THE POLYMERIZATION OF VINYL MONOMERS
Keisuke Murayama, Toshimasa Toda, and Eiko Mori, Tokyo, Japan, assignors to Sankyo Company Limited
No Drawing. Filed Mar. 10, 1971, Ser. No. 123,077
Int. Cl. C07d 31/20
U.S. Cl. 260—290 V
4 Claims

ABSTRACT OF THE DISCLOSURE

Vinyl monomer compositions inhibited against the polymerization thereof by having incorporated therein a sufficient amount to effectively inhibit said polymerization of a compound having the formula

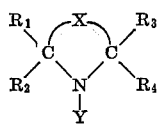

wherein $R_1$ and $R_2$ may be the same or different and each represents an alkyl group of 1–11 carbon atoms, phenyl group or hydrogen atom, privided that, where one of the $R_1$ and $R_2$ is hydrogen atom, another is an alkyl group of 1–11 carbon atoms or phenyl group or they may, together with the carbon atom to which they are attached, form the group

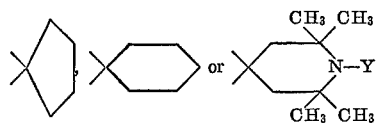

$R_3$ and $R_4$ have the same meanings as the $R_1$ and $R_2$; X represents the group

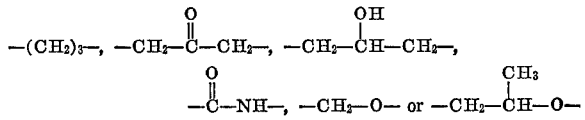

and Y represents hydrogen atom or hydroxyl group.

---

This invention relates to the inhibition of the polymerization of various vinyl monomers.

More particularly, this invention is concerned with a vinyl monomer composition stabilized or inhibited against the polymerization thereof by having incorporated therein a sufficient amount, which effectively inhibits said polymerization, of a compound having the formula

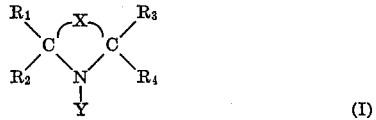   (I)

wherein $R_1$ and $R_2$ may be the same or different and each represents an alkyl group of 1–11 carbon atoms, phenyl group or hydrogen atom, provided that, where one of the $R_1$ and $R_2$ is hydrogen atom, another is the alkyl group or phenyl group, or they may, together with the carbon atom to which they are attached, form the group

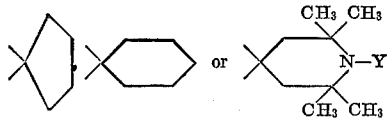

$R_3$ and $R_4$ have the same meanings as the $R_1$ and $R_2$; X represents the group

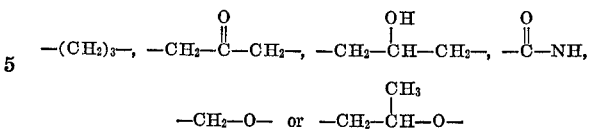

and Y represents hydrogen atom or hydroxyl group.

In the definition of the above-mentioned Formula I, the alkyl group may be illustratively exemplified by methyl, ethyl, n-propyl, isopropyl, n-butyl, isobutyl, n-pentyl, n-hexyl, n-heptyl, n-octyl, n-nonyl, n-decyl and n-undecyl.

The term "vinyl monomer" as used herein is intended to include esters of acrylic acid and methacrylic acid, acrylamide, acrylonitrile, metacrylonitrile, acrolein, metacrolein, butadine, isoprene, chloroprene, styrene, chlorostyrenes, divinylbenzene, vinylpyridine, vinyl chloride, vinylidene chloride, vinyl acetate, methyl vinyl ketone and the like.

It has been well-known in the art that various vinyl monomers are highly reactive and then, upon standing under ambient conditions, they show a pronounced tendency to polymerize by themselves. Thus, it has previously been proposed that these vinyl polymers were held in a stabilized state by having incorporated therein a certain type of polymerization inhibitors, e.g., hydroquinone, pyrogallol, Methylene Blue and the like.

However, these inhibitors are not entirely satisfactory and there has been always emphasized the need for developing a new type of polymerization inhibitors.

As a result of our studies on an polymerization inhibitor, it has now been unepectedly found that the compounds of the above-mentioned Formula I exhibit a high inhibiting effect against the undesirable polymerization of a vinyl monomer and this invention has been completed upon the above-depicted finding.

It is, accordingly, a primary object of this invention to provide a new use of the compounds of the above-mentioned Formula I for the inhibition of the polymerization of a vinyl monomer.

It is another object of this invention to provide a vinyl monomer composition inhibited against the plymerization thereof by having incorporated therein a sufficient amount to effectively inhibit said polymerization of the compound of the above-mentioned Formula I.

These and other objects of this invention will be apparent to those skilled in the art from the detailed description as follows.

The compounds of the above-mentioned Formula I which may be employed as a polymerization inhibitor in this invention are old compounds except for those compounds of the above-mentioned Formula I wherein X represents the group

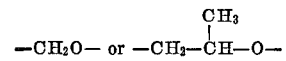

These old substances may be readily prepared according to the teachings of the prior art, for example, the Nippon Kagaku Zasshi (Journal of the Chemical Society of Japan), 90, 296 (1969), or Bulletin of the Chemical Society of Japan, 42, 1640 (1969), or by utilizing a reaction of α-aminonitrile with the corresponding aldehyde or ketone according to the following reaction schema:

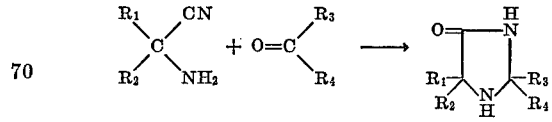

wherein $R_1$, $R_2$, $R_3$ and $R_4$ are as defined above. One group of the new compounds of the above-mentioned Formula I wherein X represents the group —$CH_2O$— can be easily prepared according to the following reaction schema:

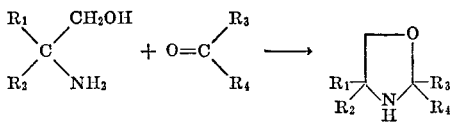

wherein $R_1$, $R_2$, $R_3$ and $R_4$ are as defined above.

Another group of the new compounds of the above-mentioned Formula I wherein X represents the group

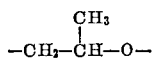

can be easily prepared according to the following reaction schema:

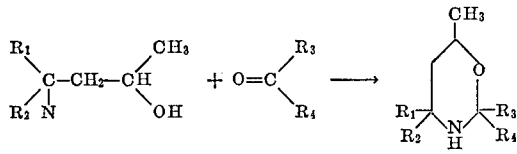

wherein $R_1$, $R_2$, $R_3$ and $R_4$ are as defined above.

Representative of the compounds of the above-mentioned Formula I which may be employed as a polymerization inhibitor for vinyl monomer in this invention are as follows:

(1) 2,2,6,6-tetramethylpiperidine.
(2) 4-hydroxy-2,2,6,6-tetramethylpiperidine.
(3) 2,2,6,6-tetramethyl-4-oxopiperidine.
(4) 1-hydroxy-2,2,6,6-tetramethyl-4-oxopiperidine.
(5) 1-aza-2,2-dimethyl-4-oxo-spiro[5.5]undecane.
(6) 1,9-diaza-2,2,8,8,10,10-hexamethyl-4-oxo-spiro[5.5]undecane.
(7) 2,2,5,5-tetramethyl-4-oxoimidazolidine.
(8) 1,4-diaza-2-ethyl-2-methyl-3-oxo-spiro[4.5]decane.
(9) 1,3-diaza-4-oxo-2-phenyl-spiro[4.5]decane.
(10) 1,3-diaza-4-oxo-2-n-undecyl-spiro[4.5]decane.
(11) Cyclohexane-1-spiro-2'-(4'-oxoimidazolidine)-5'-spiro-1''-cyclohexane.
(12) 2,2,6,6-tetramethylpiperidine-1-oxyl-4-spiro-2'-(4'-oxoimidazolidine)-5'-spiro-1''-cyclohexane.
(13) 2,4,4-trimethyl-2-phenyloxazolidine.
(14) 1-aza-2,2-dimethyl-4-oxa-spiro[4.4]nonane.
(15) 1-aza-2,2-dimethyl-4-oxa-spiro[4.5]decane.
(16) 2,2,4,4,6-pentamethyltetrahydro-1,3-oxazine.
(17) 1-aza-2,2,4-trimethyl-5-oxa-spiro[5.5]undecane.
(18) 1,4-dihydroxy-2,2,6,6-tetramethylpiperidine.
(19) Cyclohexane-1-spiro-2'-(1'-hydroxyimidazolidine)-5'-spiro-1''-cyclohexane.

For the better understanding of the production of the new compounds as set forth above, the following preparations are included herein as a reference.

PREPARATION 1

1-aza-2,2-dimethyl-4-oxa-spiro[4.5]decane

To a solution of 8.9 g. of 2-amino-2-methylpropanol and 9.8 g. of cyclohexone in 150 ml. of benzene was added 0.5 g. of ammonium acetate and the resulting mixture was heated under reflux for 5 hours while the water formed during the reaction was continuously separated. Then, the reaction mixture was subjected to distillation under reduced pressure to give 13.9 g. of the desired product as a colorless liquid boiling at 64° C./2.5 mm. Hg. Yield: 82.8%.

Analysis.—Calculated for $C_{10}H_{19}NO$ (percent): C, 70.96; H, 11.32; N, 8.23. Found (percent): C, 71.00; H, 11.35; N, 8.20.

PREPARATION 2

1-aza-2,2,4-trimethyl-5-oxa-spiro[5.5]undecane

To a solution of 11.7 g. of 4-amino-4-methyl-2-pentanol and 9.8 g. of cyclohexanone in 150 ml. of benzene was added 0.5 g. of ammonium acetate and the resulting mixture was heated under reflux for 7 hours while the water formed during the reaction was continuously separated. Then, the reaction mixture was subjected to distillation under reduced pressure to give 15.5 g. of the desired product as a colorless liquid boiling at 74–75° C./2 mm. Hg. Yield: 78.7%.

Analysis.—Calculated for $C_{12}H_{23}NO$ (percent): C, 73.04; H, 11.75; N, 7.10. Found (percent): C, 73.16; H, 11.76; N, 7.10.

Where the compounds of the above-mentioned Formula I are to be employed in the vinyl monomer for the inhibition of the polymerization thereof, they may be readily incorporated into such a monomer by means of various standard procedures commonly utilized in the art. The inhibitor compounds (I) in this invention may be favourably incorporated into the vinyl monomer at any stage during the manufacture or purification process thereof.

The amount of the inhibitor compounds to be employed in the vinyl monomer in accordance with this invention may be varied mainly depending upon the types and properties of the vinyl monomers to be treated. In general, the compound of the above-mentioned Formula I may be advantageously added to the vinyl monomer in a sufficient amount to effectively inhibit the undesirable polymerization thereof, usually in an amount of about 0.01–1% by weight, based upon the total weight of the vinyl monomer to be treated.

In order to demonstrate excellent polymerization inhibition effect of the compounds of the above-mentioned Formula I when incorporated into a vinyl monomer, the example is given hereinbelow wherein the numbers of the polymerization inhibitors shown in the results are the same of the inhibitors illustratively given in the foregoing.

EXAMPLE

Purification of vinyl monomer

The monomers to be employed were commercially available ones which were subjected to twice rectifications and employed in the test immediately after distillation.

Test method: Into a 20 ml. volume Pyrex glass tube was charged an appropriate amount of the monomer indicated below and then the polymerization inhibitor of this invention was added thereto at the addition rate (percent by weight) indicated below. After sealing, the tube was shaken at the temperature defined below for a period of time as shown below. Thereafter, the content of the tube was poured into an organic solvent in which the resulting polymer is insoluble, i.e., methanol, whereupon the resulting polymer was separated out and then weighed. The polymerization degree of the monomer was calculated from the weight of the resulting polymer.

(1) Polymerization inhibition effect against methyl methacrylate.—Polymerization conditions: 90° C., for 2.5 hours.

Results are shown in the following Table 1.

TABLE 1

| Number of polymerization inhibitor | Addition rate | Polymerization degree |
|---|---|---|
| Control (no inhibitor) | | 7.35 |
| 1 | 0.1 | 0 |
| 2 | 0.1 | 2.44 |
| 3 | 0.2 | 0 |
| 4 | 0.2 | 1.23 |
| 5 | 0.1 | 0 |
| 6 | 0.1 | 0 |
| 8 | 0.2 | 1.53 |
| 12 | 0.2 | 0.30 |
| 14 | 0.2 | 0.43 |
| 15 | 0.2 | 0.55 |

(2) Polymerization inhibition effect against vinyl acetate.—Polymerization conditions: 100° C., for 3 hours. Results are shown in the following Table 2.

TABLE 2

| Number of polymerization inhibitor | Percent of— | |
|---|---|---|
| | Addition rate | Polymerization degree |
| Control (no inhibitor) | | 45.5 |
| 1 | 0.1 | 0 |
| 2 | 0.1 | 0 |
| 3 | 0.05 | 0 |
| 4 | 0.1 | 0 |
| 7 | 0.2 | 0 |
| 10 | 0.2 | 0 |
| 11 | 0.1 | 0 |
| 13 | 0.2 | 0 |
| 15 | 0.2 | 0 |
| 16 | 0.2 | 0 |
| 17 | 0.2 | 0 |

(3) Polymerization inhibition effect against styrene.— Polymerization conditions: 100° C., for 2.5 hours. Results are shown in the following Table 3.

TABLE 3

| Number of polymerization inhibitor | Percent of— | |
|---|---|---|
| | Addition rate | Polymerization degree |
| Control (no inhibitor) | | 9.20 |
| 1 | 0.3 | 0.72 |
| 3 | 0.2 | 2.10 |
| 7 | 0.2 | 3.20 |
| 17 | 0.2 | 2.22 |

(4) Polymerization inhibition effect against vinylidene chloride.—Polymerization conditions: 60° C., for 6 hours. Results are shown in the following Table 4.

TABLE 4

| Number of polymerization inhibitor | Percent of— | |
|---|---|---|
| | Addition rate | Polymerization degree |
| Control (no inhibitor) | | 5.85 |
| 1 | 0.1 | 0 |
| 2 | 0.2 | 0.07 |
| 3 | 0.2 | 0 |
| 6 | 0.2 | 0.03 |
| 8 | 0.2 | 0 |
| 9 | 0.2 | 0.12 |
| 11 | 0.1 | 0 |
| 15 | 0.2 | 0 |
| 17 | 0.2 | 0 |

It will be apparent from the above results that the polymerization inhibitors of this invention exhibit a remarkable inhibition effect against the polymerization of various types of vinyl monomers.

What is claimed is:

1. A vinyl monomer composition selected from the group consisting of a methyl ester of acrylic acid and methacrylic acid, acrylamide, acrylonitrile, methacrylonitrile, acrolein, metacrolein, butadiene, isoprene, chloroprene, styrene, a chlorostyrene, a divinylbenzene, a vinylpyridine, vinyl chloride, vinylidene chloride, vinyl acetate and methyl vinyl ketone inhibited against the polymerization thereof by having incorporated therein a compound having the formula

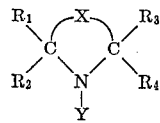

wherein $R_1$ and $R_2$ may be the same or different and each represents an alkyl group of 1–11 carbon atoms, phenyl group or hydrogen atom, provided that, where one of the $R_1$ and $R_2$ is hydrogen atom, another is the alkyl group or phenyl group, or they, together with the carbon atom to which they are attached, form the group,

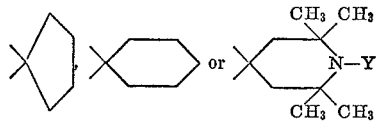

$R_3$ and $R_4$ have the same meanings as the $R_1$ and $R_2$; X represents the group

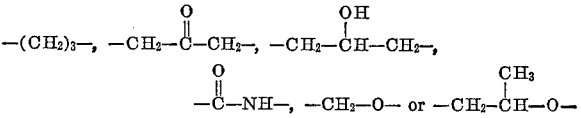

and Y represents a hydrogen atom or a hydroxyl group, said compound being present in an amount sufficient to effectively inhibit said polymerization of said vinyl monomer.

2. The vinyl monomer composition according to claim 1 wherein said amount is in the range of about 0.01–1% by weight, based upon the total weight of the vinyl monomer.

3. The vinyl monomer composition according to claim 1 wherein said vinyl monomer is selected from the group consisting of methyl methacrylate, vinylidene chloride, styrene and vinyl acetate.

4. The vinyl monomer composition according to claim 1 wherein said compound is selected from the group consisting of 2,2,6,6-tetramethylpiperidine,
2,2,6,6-tetramethyl-4-oxopiperidine,
1-hydroxy-2,2,6,6-tetramethyl-4-oxo piperidine and
cyclohexane-1-spiro - 2' - (4' - oxoimidazolidine)-5'-spiro-1''-cyclohexane.

References Cited

UNITED STATES PATENTS 3,265,751  8/1966  McCoy et al. _____ 260—666.5

HARRY I. MOATZ, Primary Examiner

U.S. Cl. X.R.

260—244 R, 293.63, 296.66, 293.89, 293.9, 307 R, 309.7, 465.9, 488 H, 526 N, 561 R, 590, 601 R, 650 R, 654 R, 656 R, 669 R, 680 R, 247

UNITED STATES PATENT OFFICE
CERTIFICATE OF CORRECTION

Patent No. 3,733,326          Dated May 15, 1973

Inventor(s) KEISUKE MURAYAMA et al

It is certified that error appears in the above-identified patent and that said Letters Patent are hereby corrected as shown below:

Column 1, lines 5-10, after "Ser. No. 123,077", add the following:

Claims priority, application Japan, March 20, 1970 23987/70.

Signed and sealed this 25th day of December 1973.

(SEAL)
Attest:

EDWARD M. FLETCHER, JR.       RENE D. TEGTMEYER
Attesting Officer              Acting Commissioner of Patents